US011688043B2

(12) United States Patent
Zhang et al.

(10) Patent No.: US 11,688,043 B2
(45) Date of Patent: Jun. 27, 2023

(54) VIDEO DEBLURRING METHOD AND APPARATUS, STORAGE MEDIUM, AND ELECTRONIC APPARATUS

(71) Applicant: TENCENT TECHNOLOGY (SHENZHEN) COMPANY LIMITED, Shenzhen (CN)

(72) Inventors: Kaihao Zhang, Shenzhen (CN); Wenhan Luo, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 364 days.

(21) Appl. No.: 16/993,922

(22) Filed: Aug. 14, 2020

(65) Prior Publication Data

US 2020/0372618 A1 Nov. 26, 2020

Related U.S. Application Data

(63) Continuation of application No. PCT/CN2019/081702, filed on Apr. 8, 2019.

(30) Foreign Application Priority Data

May 9, 2018 (CN) .......................... 201810438831.5

(51) Int. Cl.
*G06T 5/00* (2006.01)
*G06N 3/08* (2023.01)
(Continued)

(52) U.S. Cl.
CPC ............. *G06T 5/003* (2013.01); *G06N 3/045* (2023.01); *G06N 3/08* (2013.01); *G06T 5/50* (2013.01);
(Continued)

(58) Field of Classification Search
CPC ................... G06T 3/0087; G06T 5/003; G06T 2207/20201; G06V 10/40; G06V 10/454; G06V 10/62; G06N 3/08; G06N 3/0454
See application file for complete search history.

(56) References Cited

U.S. PATENT DOCUMENTS 8,345,984 B2 * 1/2013 Ji .......................... G06V 10/454
382/156
10,701,394 B1 * 6/2020 Caballero ................ G06N 3/08
(Continued)

FOREIGN PATENT DOCUMENTS

CN 106934769 A 7/2017
CN 107491771 A 12/2017
(Continued)

OTHER PUBLICATIONS

Caballero, Jose et al., Real-Time Video Super-Resolution with Spatio-Temporal Networks and Motion Compensation (Apr. 10, 2017), ARXIV ID: 1611.05250, 1-10 (Year: 2017).*
(Continued)

*Primary Examiner* — Ian L Lemieux
*Assistant Examiner* — Woo C Rhim
(74) *Attorney, Agent, or Firm* — Arentfox Schiff LLP

(57) ABSTRACT

A method of video deblurring by an electronic device is described. The processing circuitry of the electronic device acquires N continuous image frames from a video clip the N being a positive integer, and the N continuous image frames including a blurry image frame to be processed. The processing circuitry of the electronic device performs three-dimensional (3D) convolution processing on the N continuous image frames with a generative adversarial network model, to acquire spatio-temporal information corresponding to the blurry image frame. The spatio-temporal information includes spatial feature information of the blurry image frame, and temporal feature information between the (Continued)

blurry image frame and a neighboring image frame of the N continuous image frames The processing circuitry of the electronic device performs deblurring processing on the blurry image frame by using the spatio-temporal information corresponding to the blurry image frame through the generative adversarial network model, to output a sharp image frame.

20 Claims, 7 Drawing Sheets

(51) Int. Cl.
 *G06T 5/50* (2006.01)
 *G06V 10/44* (2022.01)
 *G06N 3/045* (2023.01)
(52) U.S. Cl.
 CPC .. *G06V 10/454* (2022.01); *G06T 2207/20081* (2013.01); *G06T 2207/20084* (2013.01); *G06T 2207/20221* (2013.01)

(56) References Cited

U.S. PATENT DOCUMENTS

| | | | | |
|---|---|---|---|---|
| 11,157,724 | B2* | 10/2021 | Yamada | G06V 10/82 |
| 2012/0219229 | A1* | 8/2012 | Springer | G06T 5/50 |
| | | | | 382/199 |
| 2014/0354886 | A1* | 12/2014 | Michaeli | H04N 1/4092 |
| | | | | 348/607 |
| 2015/0063717 | A1* | 3/2015 | Pavani | G06V 10/40 |
| | | | | 382/261 |
| 2017/0011494 | A1* | 1/2017 | Ahn | G06T 5/003 |
| 2017/0372456 | A1* | 12/2017 | Lee | G06T 5/10 |
| 2018/0075581 | A1* | 3/2018 | Shi | G06T 3/4046 |
| 2018/0114096 | A1 | 4/2018 | Sen et al. | |
| 2019/0139205 | A1* | 5/2019 | El-Khamy | G06K 9/6256 |
| 2020/0242425 | A1* | 7/2020 | Yamada | G06V 10/10 |

FOREIGN PATENT DOCUMENTS

| | | | | | |
|---|---|---|---|---|---|
| CN | 107730458 | A | | 2/2018 | |
| CN | 108416752 | A | * | 8/2018 | G06T 5/003 |
| CN | 109727201 | A | * | 5/2019 | |
| CN | 110728626 | A | * | 1/2020 | G06T 5/003 |
| CN | 111223062 | A | * | 6/2020 | G06N 3/0454 |
| CN | 111861894 | A | * | 10/2020 | |
| WO | WO-2011049565 | A1 | * | 4/2011 | G06T 5/003 |

OTHER PUBLICATIONS

Wang, Wenjung et al., Video Super-Resolution via Residual Learning (Apr. 25, 2018), IEEE Access (vol. 6, pp. 23767-23777) (Year: 2018).*

Takeda, Hiroyuki et al., Removing Motion Blur With Space-Time Processing (Oct. 2011), IEEE Transactions On Image Processing, vol. 20, No. 10, 2990-3000 (Year: 2011).*

Extended European Search Report dated May 20, 2021 in European Application No. 19799523.6.

Kaihoa Zhang et al. "Adversarial Spatio-Temporal Learning for Video Deblurring", Journal of Latex Class Files, vol. 14, No. 8, Aug. 2015, pp. 1-10.

* cited by examiner

VIDEO DEBLURRING METHOD AND APPARATUS, STORAGE MEDIUM, AND ELECTRONIC APPARATUS

RELATED APPLICATION

This application is a continuation of International Application No. PCT/CN2019/081702, filed on Apr. 8, 2019, which claims priority to Chinese Patent Application No. 201810438831.5, entitled "VIDEO DEBLURRING METHOD AND APPARATUS" and filed on May 9, 2018. The entire disclosures of the prior applications are hereby incorporated by reference in their entirety.

FIELD OF THE TECHNOLOGY

This application relates to the field of computer technologies, including a video deblurring method and apparatus, a storage medium, and an electronic apparatus.

BACKGROUND OF THE APPLICATION

When a user takes a video with a mobile phone or a digital camera, the shaking device and a moving object to be shot may usually cause a blurry video. Therefore, there is a realistic demand for the user to transform the taken blurry video to a sharper one.

Currently, it is proposed that deblurring processing of images in a video is completed based on a deep learning method. The related art mainly includes: inputting a plurality of frames of images together into a convolutional neural network model, extracting spatial information in a single frame of image with a 2D convolution kernel, and performing deblurring processing on the blurry video by using a reconstruction loss function as supervised information.

In the video deblurring solution in the related art, the 2D convolution kernel is used. Consequently, only the spatial information in the single frame of image can be extracted, and information between images in the video cannot be extracted. As a result, the capability of the convolutional neural network model to utilize the spatial information in the related art is limited. Besides, because merely the pixel-based reconstruction loss function is used as the supervised information, a video after deblurring appears insufficiently real, reducing the effect of video deblurring.

SUMMARY

Embodiments of this application provide a video deblurring method and apparatus, a storage medium, and an electronic apparatus, to enhance the effect of video deblurring.

In order to resolve the foregoing technical problem, the embodiments of this application provide the following technical solutions.

According to one aspect, a video deblurring method is provided. The deblurring method includes acquiring, by an electronic device, N continuous image frames from a video clip, the N being a positive integer, and the N continuous image frames including a blurry image frame to be processed. The method includes performing, by the electronic device, three-dimensional (3D) convolution processing on the N continuous image frames with a generative adversarial network model, to acquire spatio-temporal information corresponding to the blurry image frame. The spatio-temporal information includes spatial feature information of the blurry image frame, and temporal feature information between the blurry image frame and a neighboring image frame of the N continuous image frames. The deblurring method further includes performing, by the electronic device, deblurring processing on the blurry image frame by using the spatio-temporal information corresponding to the blurry image frame through the generative adversarial network model, to output a sharp image frame.

According to another aspect, video deblurring apparatus is provided. The video deblurring apparatus includes processing circuitry that is configured to acquire N continuous image frames from a video clip, the N being a positive integer, and the N continuous image frames including a blurry image frame to be processed. The processing circuitry is configured to perform three-dimensional (3D) convolution processing on the N continuous image frames with a generative adversarial network model, to acquire spatio-temporal information corresponding to the blurry image frame. The spatio-temporal information includes spatial feature information of the blurry image frame, and temporal feature information between the blurry image frame and a neighboring image frame of the N continuous image frames. The processing circuitry further performs deblurring processing on the blurry image frame by using the spatio-temporal information corresponding to the blurry image frame through the generative adversarial network model, to output a sharp image frame.

According to yet another aspect, a non-transitory computer-readable storage medium is provided that stores instructions which when executed by at least one processor cause the at least one processor to perform a deblurring process. The process includes acquiring N continuous image frames from a video clip, the N being a positive integer, and the N continuous image frames including a blurry image frame to be processed. The process includes performing three-dimensional (3D) convolution processing on the N continuous image frames with a generative adversarial network model, to acquire spatio-temporal information corresponding to the blurry image frame. The spatio-temporal information includes spatial feature information of the blurry image frame, and temporal feature information between the blurry image frame and a neighboring image frame of the N continuous image frames. The process further includes performing deblurring processing on the blurry image frame by using the spatio-temporal information corresponding to the blurry image frame through the generative adversarial network model, to output a sharp image frame.

It may be learned from the foregoing technical solutions that the embodiments of this application have the following advantages.

According to the embodiments of this application, the N continuous image frames are first acquired from the video clip, the N continuous image frames including the blurry image frame to be processed; and then the 3D convolution processing is performed on the N continuous image frames with the generative adversarial network model, to acquire the spatio-temporal information corresponding to the blurry image frame, the spatio-temporal information including: the spatial feature information of the blurry image frame, and the temporal feature information between the blurry image frame and the neighboring image frame of the N continuous image frames. The deblurring processing is finally performed on the blurry image frame by using the spatio-temporal information corresponding to the blurry image frame through the generative adversarial network model, to output the sharp image frame. According to the embodiments of this application, the generative adversarial network model extracts the spatio-temporal information implicit between the continuous image frames through a 3D convolution operation, so that the deblurring processing on the blurry image frame is completed by using the spatio-temporal information corresponding to the blurry image frames through the generative adversarial network model. Therefore, a more real sharp image can be obtained, and the effect of video deblurring is enhanced.

BRIEF DESCRIPTION OF THE DRAWINGS

To describe the technical solutions in the embodiments of this application more clearly, the following briefly introduces the accompanying drawings required for describing the embodiments. The accompanying drawings in the following description show only some embodiments of this application, and a person skilled in the art may still derive other accompanying drawings from the accompanying drawings.

DESCRIPTION OF EMBODIMENTS

Embodiments of this application provide a video deblurring method and apparatus to enhance the effect of video deblurring.

To make objectives, features, and advantages of this application clearer and more comprehensible, the following describes the technical solutions in the embodiments of this application with reference to the accompanying drawings in the embodiments of this application. The embodiments described below are merely some rather than all of the embodiments of this application. All other embodiments obtained by a person skilled in the art based on the embodiments of this application shall fall within the protection scope of this application.

In the specification, the claims, and the foregoing accompanying drawings of this application, the terms "include", "comprise", "have", and any other variations are meant to cover the non-exclusive inclusion, so that a process, method, system, product, or device that includes a list of units is not necessarily limited to those listed units, but may include other units not expressly listed or inherent to such a process, method, system, product, or device.

A detailed description is given below.

The embodiments of this application provide a video deblurring method based on deep learning. The embodiments of this application can restore a blurry video through a deep neural network, which is applied to deblurring processing on a video taken by a camera. A video deblurring apparatus is further provided in the embodiments of this application. The video deblurring apparatus may be deployed in a terminal in a form of video processing software. The video deblurring apparatus may alternatively be a server storing a video. In the video deblurring method according to this embodiment of this application, a generative adversarial network (GAN) model is obtained by training in a deep learning manner. The generative adversarial network model can be implemented by a convolutional neural network model. Specifically, a plurality of frames of images neighboring each frame of image are inputted together into the generative adversarial network model; feature extraction and integration are performed on a video with a plurality of frames by using the generative adversarial network model; a 3D convolution operation is performed by using a three-dimensional (3D) convolution kernel in the generative adversarial network model; spatio-temporal information implicit between continuous image frames is extracted; and a blurry image frame is restored to a sharp one in an equal proportion by performing a full convolution operation, so that a more real sharp image can be obtained. The generative adversarial network model adopted in this embodiment of this application can effectively extract the spatio-temporal information to process the blurry image frame, thereby automatically restoring the blurry video.

Figure 1:
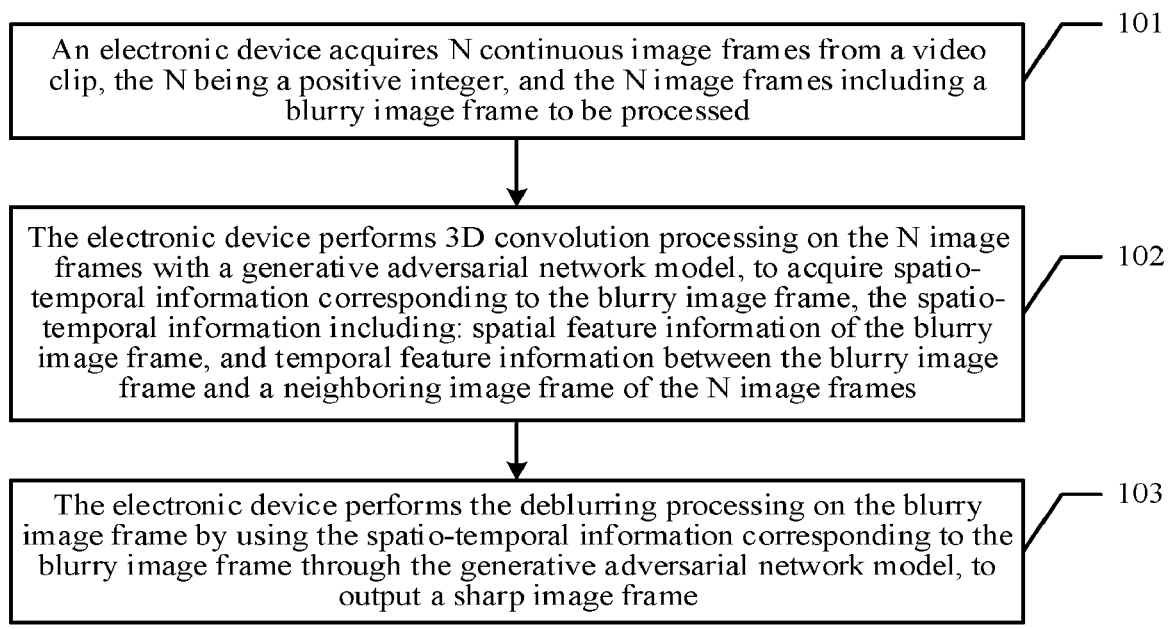
FIG. 1 is a schematic block flowchart of a video deblurring method according to an embodiment of this application.

FIG. 1 is a schematic block flowchart of a video deblurring method according to an embodiment of this application. The video deblurring method can be executed by an electronic device. The electronic device may be a terminal or server. The following is described with the electronic device executing the video deblurring method as an example. Referring to FIG. 1, the method may include the following steps:

In step 101, the electronic device acquires N continuous image frames from a video clip, the N being a positive integer, and the N image frames including a blurry image frame to be processed.

According to this embodiment of this application, the video clip may be shot by the terminal through a camera, or may be downloaded from the Internet by the terminal. As long as there is at least one frame of blurry image in the video clip, a sharp image can be restored by using the video deblurring method according to this embodiment of this application. At first, the N continuous image frames are acquired from the video clip, the N image frames including at least one blurry image frame to be processed. The blurry image frame may be caused by a shake of a shooting device or a movement of an object to be shot. There may be one blurry image frame to be processed of the N continuous image frame acquired at first according to this embodiment of this application. For example, the blurry image frame may be a middle image frame of the N continuous image frame. If the value of N is 3, the blurry image frame may be the second image frame, or if the value of N is 5, the blurry image frame may be the third image frame. The value of N is a positive integer not limited herein.

In step 102, the electronic device performs 3D convolution processing on the N image frames with a generative adversarial network model, to acquire spatio-temporal information corresponding to the blurry image frame, the spatio-temporal information including: spatial feature information of the blurry image frame, and temporal feature information between the blurry image frame and a neighboring image frame of the N image frames.

According to this embodiment of this application, a trained generative adversarial network model may be used to perform video deblurring processing. After acquiring the N continuous image frames, the N continuous image frames are inputted into the generative adversarial network model; the 3D convolution operation is performed by using a 3D convolution kernel in the generative adversarial network model; and the spatio-temporal information implicit between the continuous image frames is extracted. The spatio-temporal information includes: the spatial feature information of the blurry image frame, that is, the spatial feature information is hidden in a single frame of blurry image, and the temporal feature information is the temporal information between the blurry image frame and the neighboring image frame. For example, temporal feature information can be extracted through the 3D convolution operation, the information being between a blurry image frame and two neighboring image frames prior to the blurry image frame and two neighboring image frames behind the blurry image frame. According to this embodiment of this application, the spatio-temporal information, that is, the temporal feature information and the spatial feature information can be extracted through the 3D convolution kernel. Therefore, effective utilization of the feature information hidden between the continuous images in the video clip, in combination with the trained generative adversarial network model, can enhance the effect of deblurring processing on a blurry image frame. For details, reference is made to descriptions of video deblurring in a subsequent embodiment.

In step 103, the electronic device performs deblurring processing on the blurry image frame by using the spatio-temporal information corresponding to the blurry image frame through the generative adversarial network model, to output a sharp image frame.

According to this embodiment of this application, after the spatio-temporal information corresponding to the blurry image frame is extracted by performing the 3D convolution operation through the 3D convolution kernel in the generative adversarial network model, the spatio-temporal information corresponding to the blurry image frame can be used as an image feature to perform a predicted output through the generative adversarial network model. An output result of the generative adversarial network model is a sharp image frame obtained after deblurring the blurry image frame. Because the 3D convolution operation is adopted by the generative adversarial network model according to this embodiment of this application, the temporal feature information and the spatial feature information can be extracted. This type of feature information can be used to predict the sharp image frame corresponding to the blurry image frame.

In this embodiment of this application, the 3D convolution kernel is mainly used to process continuous video frames, so that spatio-temporal information implicit in the continuous video frames can be extracted more effectively. Moreover, the use of the generative adversarial network model can better ensure that a restored sharp video is more real.

A training process of a generative adversarial network model according to an embodiment of this application is illustrated next with examples. Specifically, the generative adversarial network model according to this embodiment of this application includes a generative network model and a discriminative network model. The generative adversarial network model according to this embodiment of this application includes at least two network models. One is a generative network model the other is a discriminative network model. Through mutual game learning between the generative network model and the discriminative network model, a fairly good output is generated through the generative adversarial network model.

According to some embodiments of this application, before the electronic device performs three-dimensional (3D) convolution processing on the N image frames with a generative adversarial network model, the video deblurring method provided in the embodiments of this application further includes the following.

Step A1 includes the electronic device acquiring N continuous sample image frames and a real sharp image frame for discrimination from a video sample library, the N sample image frames including a blurry sample image frame for training, and the real sharp image frame corresponding to the blurry sample image frame.

Step A2 includes the electronic device extracting spatio-temporal information corresponding to the blurry sample image frame from the N sample image frames by using a 3D convolution kernel in the generative network model.

Step A3 includes the electronic device performing deblurring processing on the blurry sample image frame by using the spatio-temporal information corresponding to the blurry sample image frame through the generative network model, to output a sharp sample image frame.

Step A4 includes the electronic device training the generative network model and the discriminative network model alternately according to the sharp sample image frame and the real sharp image frame.

According to this embodiment of this application, the video sample library can be set for model training and discrimination. For example, a segment of N continuous sample image frames is adopted for the model training. The "sample image frame" herein is different from the image frame in step 101. The sample image frame is a sample image in the video sample library. The N sample image frames include a blurry sample image frame, and in order to discriminate an output result of the generative network model, a real sharp image frame is further provided. The real sharp image frame corresponds to the blurry sample image frame, that is, the real sharp image frame is a sharp image frame that is real and corresponds to the blurry sample image frame.

Next, the spatio-temporal information corresponding to the blurry sample image frame and extracted from the N sample image frames by using the 3D convolution kernel in the generative network model is displayed. The spatio-temporal information may include: the spatial feature information of the blurry sample image frame, and the temporal feature information between the blurry sample image frame and the neighboring image frame of the N image frames. The generative network model may be a convolutional neural network model. After acquiring the spatio-temporal information corresponding to the blurry sample image frame, the deblurring processing is then performed on the blurry sample image frame by using the spatio-temporal information corresponding to the blurry sample image frame through the generative network model. The subsequent embodiments describe a training process of the generative network model in detail. Through the deblurring processing by the generative network model, the sharp sample image frame can be outputted. The sharp sample image frame is the result outputted after the generative network model performs the deblurring on the blurry sample image frame.

After the generative network model outputs the sharp sample image frame, whether the outputted sharp sample image frame is blurry or sharp is discriminated according to the sharp sample image frame and the real sharp image frame by using the discriminative network model. An adversarial loss function is introduced by using the discriminative network model, to alternately train the generative network model and the discriminative network model a plurality of times, thereby better ensuring that a restored sharp video is more real.

Further, according to some embodiments of this application, the generative network model includes: a first 3D convolution kernel, and a second 3D convolution kernel. In this implementation, step A2 that the electronic device extracts spatio-temporal information corresponding to the blurry sample image frame from the N sample image frames by using a 3D convolution kernel in the generative network model includes the following steps.

Step A11 includes performing convolution processing on the N sample image frames with the first 3D convolution kernel, to acquire low-level spatio-temporal features corresponding to the blurry sample image frame.

Step A12 includes performing the convolution processing on the low-level spatio-temporal features with the second 3D convolution kernel, to acquire high-level spatio-temporal features corresponding to the blurry sample image frame.

Step A13 includes fusing the high-level spatio-temporal features corresponding to the blurry sample image frame, to acquire spatio-temporal information corresponding to the blurry sample image frame.

At first, two 3D convolutional layers are set in the generative network model. On each 3D convolutional layer, different 3D convolution kernels may be used. For example, the first 3D convolution kernel and the second 3D convolution kernel have different weight parameters. The first 3D convolution kernel is first used to perform the convolution processing on the N sample image frames, to acquire the low-level spatio-temporal features corresponding to the blurry sample image frame. The low-level spatio-temporal features indicate inconspicuous feature information, such as features of lines. Then taking the low-level spatio-temporal features as an input condition, the convolution processing is performed on the other 3D convolutional layer, to acquire the high-level spatio-temporal features corresponding to the blurry sample image frame. The high-level spatio-temporal features indicate feature information of neighboring image frames. At last, the high-level spatio-temporal features are fused together to acquire the spatio-temporal information corresponding to the blurry sample image frame. The spatio-temporal information can be used as a feature map for training of the generative network model. The following is an illustration with an example: the first 3D convolution kernel is first used to perform the convolution processing on 5 sample image frames, to acquire 3 low-level spatio-temporal features in different dimensions; then the convolution processing is performed on the low-level spatio-temporal features by using the second 3D convolution kernel, to acquire high-level spatio-temporal features corresponding to the blurry sample image frames; and the high-level spatio-temporal features are fused to acquire spatio-temporal information corresponding to the blurry sample image frames. Because 5 frames of images are inputted into the generative network model, after 2 times of 3D convolution processing, one frame of feature map is outputted, that is, after the 2 times of 3D convolution processing, a quantity of channels of time series is changed from 5 to 1.

Further, according to some embodiments of this application, the generative network model further includes M 2D convolution kernels, the M being a positive integer. Step A3 that the electronic device performs deblurring processing on the blurry sample image frame by using the spatio-temporal information corresponding to the blurry sample image frame through the generative network model, to output a sharp sample image frame includes the following steps.

Step A31 includes performing convolution processing on the spatio-temporal information corresponding to the blurry sample image frame by using each 2D convolution kernel of the M 2D convolution kernels in sequence, and acquire the sharp sample image frame after the convolution processing is performed by using the last 2D convolution kernel of the M 2D convolution kernels.

According to the embodiments of this application, not only may there be two 3D convolution kernels, but also a plurality of 2D convolution kernels in the generative network model. The convolution processing is performed on the spatio-temporal information corresponding to the blurry sample image frame by using the plurality of 2D convolution kernels in sequence, and the sharp sample image frame is acquired after the convolution processing is performed by using the last 2D convolution kernel of the M 2D convolution kernels. Refer to descriptions in subsequent embodiments for a specific implementation of the 2D convolution kernel.

According to some embodiments of this application, an odd 2D convolution kernel of the M 2D convolution kernels includes: a first convolutional layer, a normalization layer, and an activation function, and an even 2D convolution kernel of the M 2D convolution kernels includes: a second convolutional layer and an activation function.

Each 2D convolution kernel may be implemented with reference to an application scenario. The odd 2D convolution kernel indicates the first 2D convolution kernel, the third 2D convolution kernel, or the like of the M 2D convolution kernels. The odd 2D convolution kernel includes: the convolutional layer, the normalization layer, and the activation function (Rectified Linear Unit, ReLu). The even 2D convolution kernel of the M 2D convolution kernels indicates the second 2D convolution kernel, the 4th 2D convolution kernel, or the like of the M 2D convolution kernels. The even 2D convolution kernel includes: the convolutional layer and the activation function. Refer to descriptions of a convolutional neural network for a specific calculating process of the normalization layer and the activation function, and details are not described herein again.

According to some embodiments of this application, step A4 that the electronic device trains the generative network model and the discriminative network model alternately according to the sharp sample image frame and the real sharp image frame includes the following steps.

Step A41 includes acquiring a reconstruction loss function according to the sharp sample image frame and the real sharp image frame.

Step A42 includes training the generative network model through the reconstruction loss function.

Step A43 includes training the discriminative network model by using the real sharp image frame and the sharp sample image frame, to acquire an adversarial loss function outputted by the discriminative network model.

Step A44 includes training the generative network model continually through the adversarial loss function.

In order to acquire a more real deblurred video, the discriminative network model may be further introduced when the generative network model is trained. During the training, the generative network model is first trained: inputting a blurry sample image frame into the generative network model, to generate a sharp sample image frame; acquiring the reconstruction loss function by comparing the sharp sample image frame to the real sharp image frame; and adjusting a weight parameter of the generative network model through the reconstruction loss function. Next, the discriminative network model is trained: inputting the real sharp video and the generated sharp sample video into the discriminative network model, to acquire the adversarial loss function; and adjusting the generative network model through the adversarial loss function, to equip the discriminative network model with a capability of discriminating between the real sharp image and the sharp image generated from the blurry image frame. In this way, structures of the two network models are alternately trained.

Further, according to some embodiments of this application, step A4 of training the generative network model and the discriminative network model alternately according to the sharp sample image frame and the real sharp image frame, in addition to including the foregoing step A41 to step A44, may further include the following steps.

Step A45 includes reacquiring a reconstruction loss function through the generative network model, and reacquire an adversarial loss function through the discriminative network model, after the training the generative network model continually through the adversarial loss function.

Step A46 includes performing weighted fusion on the reacquired reconstruction loss function and the reacquired adversarial loss function, to acquire a fused loss function.

Step A47 includes training the generative network model continually through the fused loss function.

After training the generative network model and the discriminative network model through the foregoing step A41 to step A44, step A45 to step A47 are performed based on the two network models after the first training. When training the generative network model again, a structure of the generative network model is adjusted by using the two types of loss functions together, so that an image can be similar to a real sharp image at a pixel level, and appear more like a sharp image as a whole. The two loss functions can be joined with a weight parameter. The weight can be used to control the effect of the two types of loss functions on feedback regulation. The effect of the generative network model is to generate a sharp video from a blurry video, and the effect of the discriminative network model is to discriminate whether an inputted video frame is a real sharp image or a generated sharp image. Through the adversarial learning according to this embodiment of this application, the discriminative capability of the discriminative network model gets increasingly strong, and the video generated by the generative network model gets increasingly real.

According to the above description, the N continuous image frames are first acquired from the video clip, the N image frames including the blurry image frame to be processed; then the 3D convolution processing is performed on the N image frames with the generative adversarial network model, to acquire the spatio-temporal information corresponding to the blurry image frame, the spatio-temporal information including: the spatial feature information of the blurry image frame, and the temporal feature information between the blurry image frame and the neighboring image frame of the N image frames. The deblurring processing is finally performed on the blurry image frame by using the spatio-temporal information corresponding to the blurry image frame through the generative adversarial network model, to output the sharp image frame. According to the embodiments of this application, the generative adversarial network model extracts the spatio-temporal information implicit between the continuous image frames through a 3D convolution operation, so that the deblurring processing on the blurry image frame is completed by using the spatio-temporal information corresponding to the blurry image frames through the generative adversarial network model. Therefore, a more real sharp image can be obtained, and the effect of video deblurring is enhanced.

To facilitate better understanding and implementation of the foregoing solution provided by the embodiments of this application, specific descriptions are illustrated below with corresponding application scenarios as examples.

A video deblurring method according to the embodiments of this application can provide a service for video deblurring. When a video is taken by a mobile phone or a digital camera, the shaking device and a moving object to be shot may cause a blurry video. When the video deblurring method according to the embodiments of this application is applied to the mobile phone and the digital camera, the blurry video taken will become sharper. In addition, the video deblurring method according to the embodiments of this application can be deployed in a back-end server. When a user uploads some blurry videos taken by the user, use of the video deblurring method according to the embodiments of this application makes the videos of the user become sharper.

The video deblurring method according to the embodiments of this application adopts an end-to-end processing method, including: pre-processing a video frame; extracting low-level spatio-temporal information from the video frame; then extracting high-level spatio-temporal information from the video frame; performing model training by using two types of loss functions; and finally reconstructing a sharp video by using an obtained model. FIG. 1 is the specific flowchart of the method.

Figure 2:
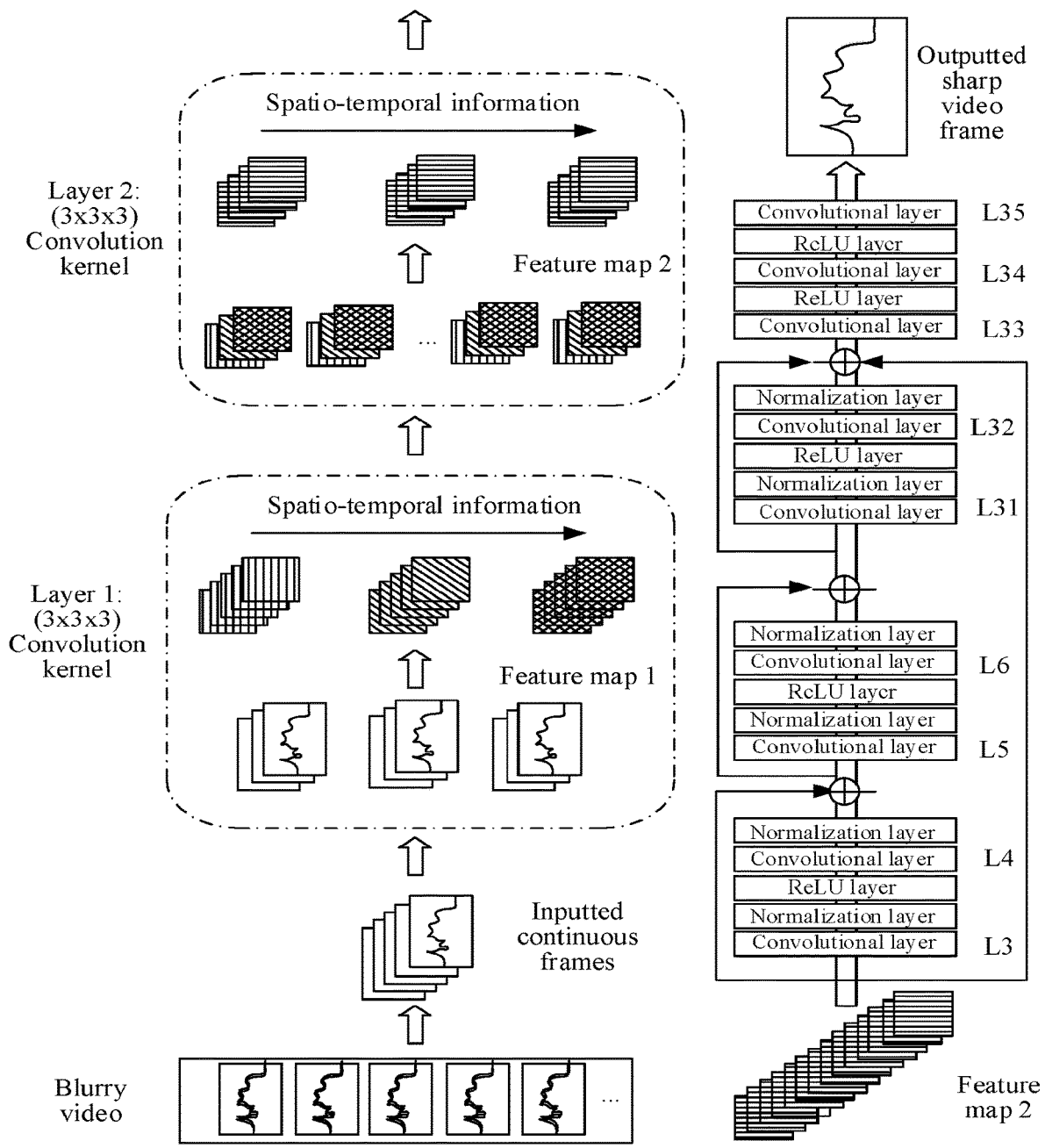
FIG. 2 is a schematic diagram of a process of performing deblurring processing on a blurry image frame through a generative network model according to an embodiment of this application.

FIG. 2 is a schematic diagram of a process of performing deblurring processing on a blurry image frame through a generative network model according to an embodiment of this application. The specific solution is as follows: for a video with a length of T seconds, 5 neighboring frames of images are selected as an input. First two convolutional layers use a 3D convolution operation to extract spatio-temporal information of the neighboring video frames. Because the 5 frames are inputted, and features can be better fused after the 3D convolution operation is performed twice, a quantity of channels of time series is changed from 5 to 1. Next, 33 2D convolution kernels are used to perform a feature extraction operation and an image reconstruction operation on the image. Through the foregoing 3D convolution operation, temporal information is fused into spatial information, to acquire the spatio-temporal information. Therefore, a 2D convolution operation is then performed. After each convolution operation, an output is processed by using a normalization layer and an activation function ReLU. From the third layer to the 32nd layer, the batch normalization (BN) layer and the activation function ReLU follow immediately after the convolution operation of an odd layer, and the batch normalization (BN) layer follows after the convolution operation of an even layer. The function ReLU is used after the convolution operations of the $33^{rd}$ to $34^{th}$ layers. After the convolution operation of the $35^{th}$ layer, a final sharp video frame is acquired. All operations belong to a full convolution operation. The full convolution indicates that no fully connected layer is used, because an up-sampling operation or a down-sampling operation does not need to be performed on the image. During training, in the embodiments of this application, an adversarial network structure may be further introduced. Using a reconstruction loss function and an adversarial loss function in the embodiments of this application, a generative network can perform adaptive adjustment, making an image become sharper. Therefore, a more real video is acquired.

Next, a calculating process of a 3D convolution in the embodiments of this application is illustrated with examples. The method for video deblurring operations in the solution is mainly based on a convolutional neural network, which is to extract spatio-temporal information implicit in neighboring video frames by utilizing an advantage that the 3D convolution can extract a spatio-temporal feature, and reconstruct a blurry video to acquire a sharp video. A 3D convolution operation is:

$$V_{ij}^{xyz} = \sigma\left(\sum_m \sum_{p=0}^{P_i-1} \sum_{q=0}^{Q_i-1} \sum_{r=0}^{R_i-1} v_{(i-1)m}^{(x+p)(y+q)(z+r)} \cdot g_{ijm}^{pqr} + b_{ij}\right)$$

where $V_{ij}^{xyz}$ is a spatio-temporal feature value of the $j^{th}$ feature layer on the $i^{th}$ layer at a position (x, y, z), ($P_i$, $Q_j$, $R_r$) is a size of a 3D convolution kernel, $Q_j$ represents a time dimension, and $\sigma(\cdot)$ represents the function ReLu. An operation process of the entire convolutional network is shown in FIG. 2. b is a bias function, g is a network weight, v is a feature value of an inputted feature map, and m represents a number counting how many times images are inputted.

Figure 3:
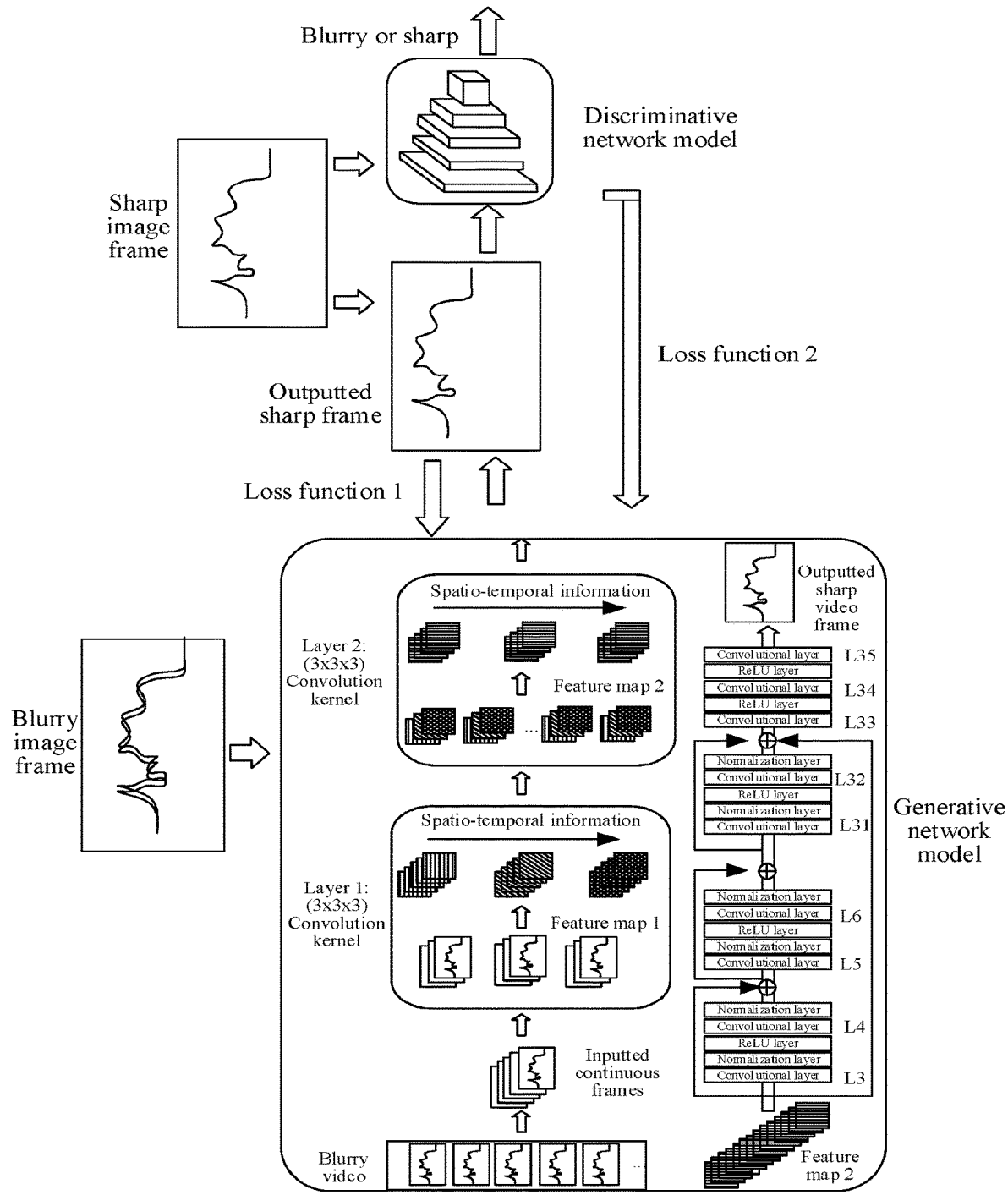
FIG. 3 is a schematic diagram of a training process of a generative network model and a discriminative network model according to an embodiment of this application.

FIG. 3 is a schematic diagram of a training process of a generative network model and a discriminative network model according to an embodiment of this application. A discriminative network model (briefly referred to as discriminative network) and a generative network model (briefly referred to as generative network) are joined together to form an adversarial network. The two compete with each other. In order to acquire a more real deblurred video, an adversarial network structure is introduced when the generative network model shown in FIG. 2 is trained. The network structure in FIG. 2 is taken as a generator (namely, generative network model), and a discriminator (namely, discriminative network model) is added. During the training, the generative network is trained at first: inputting a blurry video frame into the generative network, to acquire a sharp video frame; acquiring a reconstruction loss function (namely, loss function 1 shown in FIG. 3), by comparing the sharp video frame to a real video frame; and adjusting a weight parameter of the generative network through the loss function. Next, the discriminative network is trained: inputting the real sharp video and the generated sharp video into the discriminative network, to acquire an adversarial loss function (namely, loss function 2 in FIG. 3); and adjusting the generative network structure through the adversarial loss function, to equip the discriminative network with a capability of discriminating between a real sharp image and a sharp image generated from a blurry image. The two network structures are alternately trained. When the generative network is trained later, a structure of the network model is adjusted by using the two types of loss functions together, so that an image can be similar to a real sharp image at a pixel level, and appear more like a sharp image as a whole. The two loss functions are joined with a weight parameter. The weight can be used to control the effect of the two types of loss functions on feedback regulation. The effect of the generative network is to generate a sharp video from a blurry video, and the effect of the discriminative network is to discriminate whether the inputted video frame is a real sharp image or a generated sharp video frame. Through the adversarial learning, the discriminative capability of the discriminative network gets increasingly strong, and the video generated by the generative network gets increasingly real.

Next, weighted fusion of two different types of loss functions is illustrated with an example. Because two networks are used in this embodiment of this application, that is, a generative network and a discriminative network, two loss functions are used in this embodiment of this application, that is, a content loss function based on pixel-value differencing (that is a reconstruction loss function) and an adversarial loss function.

At first, the content loss function based on pixel-value differencing is:

$$L_{content} = \frac{1}{WH} \sum_{x=1}^{W} \sum_{y=1}^{H} (I_{x,y}^{sharp} - G(I^{blurry})_{x,y})^2$$

where W and H represent a length and a width of a video frame, $I_{x,y}^{sharp}$ is a pixel value of a real sharp video frame on a position (x, y), and $G(I^{blurry})_{x,y}$ is a value of a generated video frame on the corresponding position.

The adversarial loss function is:

$$L_{adversarial} = \log(1 - D(G(I^{blurry})))$$

where $G(I^{blurry})$ is a probability that a generated video frame is considered as a real video frame by the discriminative network, and D represents the discriminative network.

The two loss functions are joined through the following formula:

$$L = L_{content} + a \cdot L_{adversarial}$$

where a represents a weight of the two functions. During an experiment, according to this embodiment of this application, the effect is better when a is set to 0.0002. Through the formula, the generative network can perform parameter adjustment, to obtain a better generative network.

The method according to the embodiments of this application can improve the related capability of video deblurring, can automatically perform a deblurring operation on a video, can be used in post-processing of a video taken by a device such as a mobile phone or a digital camera, and can also be used by a back-end web server to perform the deblurring processing on a video uploaded by a user, to acquire a sharper video.

The foregoing method embodiments are expressed as a series of action combinations for the purpose of brief description, but a person skilled in the art is to know that because some steps may be performed in other sequences or simultaneously according to the embodiments of this application, the embodiments of this application are not limited to a described action sequence. In addition, a person skilled in the art is to also know that the embodiments described in this specification are all exemplary embodiments; and therefore, an action and a module involved are not necessarily mandatory in the embodiments of this application.

In order to facilitate the implementation of the foregoing solutions according to the embodiments of this application, relevant apparatuses for implementing the foregoing solutions are further provided below.

Figure 4A:
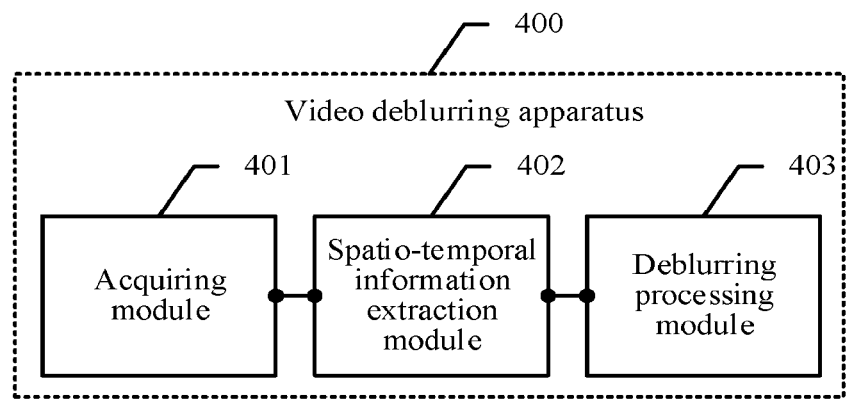
FIG. 4A is a schematic structural diagram of composition of a video deblurring apparatus according to an embodiment of this application.

FIG. 4A is a schematic structural diagram of composition of a video deblurring apparatus according to an embodiment of this application. Referring to FIG. 4A, this embodiment of this application provides a video deblurring apparatus 400. The apparatus includes one or more processors (e.g., processing circuitry) and one or more memories storing program units, the program unit being executed by the processor. The program unit may include: an acquiring module 401, a spatio-temporal information extraction module 402, and a deblurring processing module 403.

The acquiring module 401 is configured to acquire N continuous image frames from a video clip, the N being a positive integer, and the N image frames including a blurry image frame to be processed.

The spatio-temporal information extraction module 402 is configured to perform three-dimensional (3D) convolution processing on the N image frames with a generative adversarial network model, to acquire spatio-temporal information corresponding to the blurry image frame, the spatio-temporal information including: spatial feature information of the blurry image frame, and temporal feature information between the blurry image frame and a neighboring image frame of the N image frames.

The deblurring processing module 403 is configured to perform deblurring processing on the blurry image frame by using the spatio-temporal information corresponding to the blurry image frame through the generative adversarial network model, to output a sharp image frame.

Figure 4B:
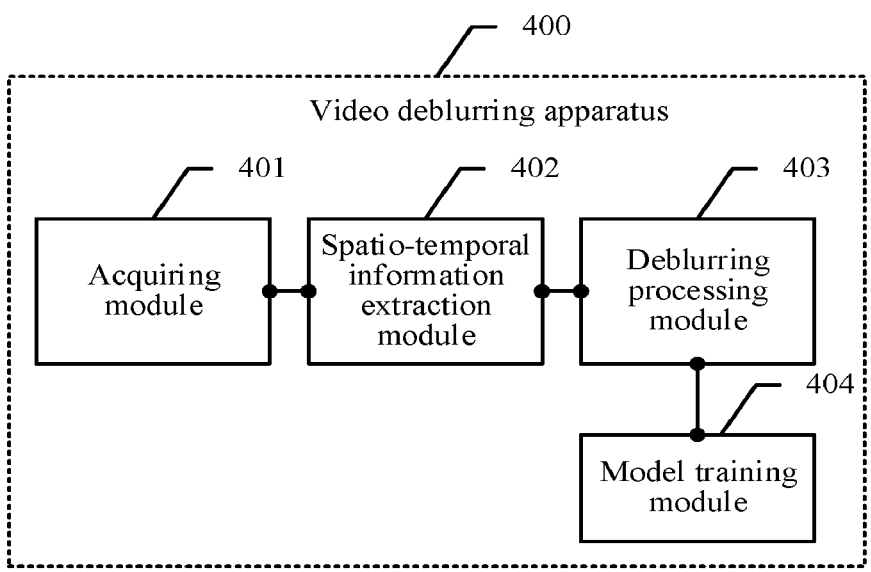
FIG. 4B is a schematic structural diagram of composition of another video deblurring apparatus according to an embodiment of this application.

According to some embodiments of this application, the generative adversarial network model includes a generative network model and a discriminative network model. FIG. 4B is a schematic structural diagram of composition of another video deblurring apparatus according to an embodiment of this application. As shown in FIG. 4B, the program unit further includes a model training module 404.

The acquiring module 401 is further configured to acquire N continuous sample image frames and a real sharp image frame for discrimination from a video sample library, the N sample image frames including a blurry sample image frame for training, and the real sharp image frame corresponding to the blurry sample image frame.

The spatio-temporal information extraction module 402 is further configured to extract spatio-temporal information corresponding to the blurry sample image frame from the N sample image frames by using a 3D convolution kernel in the generative network model.

The deblurring processing module 403 is further configured to perform the deblurring processing on the blurry sample image frame by using the spatio-temporal information corresponding to the blurry sample image frame through the generative network model, to output a sharp sample image frame.

The model training module 404 is configured to train the generative network model and the discriminative network model alternately according to the sharp sample image frame and the real sharp image frame.

Figure 4C:
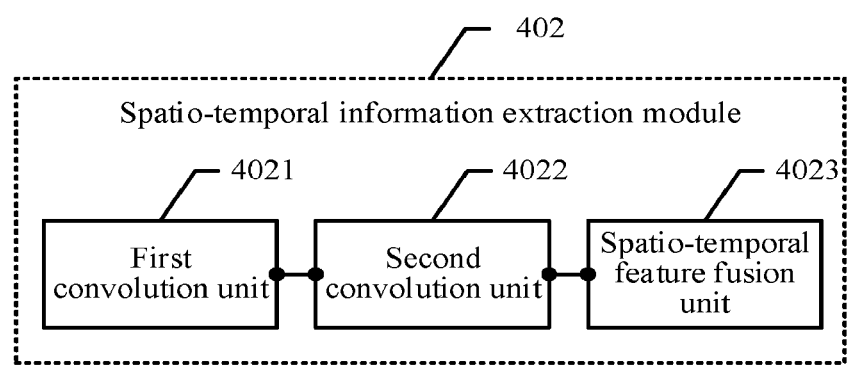
FIG. 4C is a schematic structural diagram of composition of a spatio-temporal information extraction module according to an embodiment of this application.

According to some embodiments of this application, the generative network model includes: a first 3D convolution kernel, and a second 3D convolution kernel. FIG. 4C is a schematic structural diagram of composition of a spatio-temporal information extraction module according to an embodiment of this application. As shown in FIG. 4C, the spatio-temporal information extraction module 402 includes a first convolution unit 4021, a second convolution unit 4022, and a spatio-temporal feature fusion unit 4023.

The first convolution unit 4021 is configured to perform convolution processing on the N sample image frames with the first 3D convolution kernel, to acquire low-level spatio-temporal features corresponding to the blurry sample image frame.

The second convolution unit 4022 is configured to perform the convolution processing on the low-level spatio-temporal features with the second 3D convolution kernel, to acquire high-level spatio-temporal features corresponding to the blurry sample image frame.

The spatio-temporal feature fusion unit 4023 is configured to fuse the high-level spatio-temporal features corresponding to the blurry sample image frame, to acquire spatio-temporal information corresponding to the blurry sample image frame.

According to some embodiments of this application, the generative network model further includes M 2D convolution kernels, the M being a positive integer. The deblurring processing module 403 is specifically configured to perform convolution processing on the spatio-temporal information corresponding to the blurry sample image frame by using each 2D convolution kernel of the M 2D convolution kernels in sequence, and acquire the sharp sample image frame after the convolution processing is performed by using the last 2D convolution kernel of the M 2D convolution kernels.

According to some embodiments of this application, an odd 2D convolution kernel of the M 2D convolution kernels includes: a first convolutional layer, a normalization layer, and an activation function, and an even 2D convolution kernel of the M 2D convolution kernels includes: a second convolutional layer and an activation function.

Figure 4D:
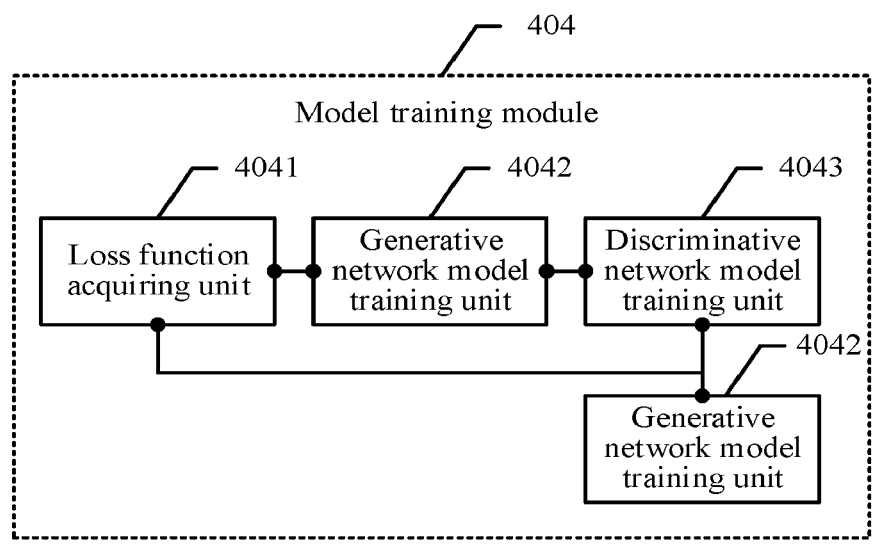
FIG. 4D is a schematic structural diagram of composition of a model training module according to an embodiment of this application.

FIG. 4D is a schematic structural diagram of composition of a model training module according to an embodiment of this application. According to some embodiments of this application, as shown in FIG. 4D, the model training module 404 includes a loss function acquiring unit 4041, a generative network model training unit 4042, and a discriminative network model training unit 4043.

The loss function acquiring unit 4041 is configured to acquire a reconstruction loss function according to the sharp sample image frame and the real sharp image frame. The generative network model training unit 4042 is configured to train the generative network model through the reconstruction loss function. The discriminative network model training unit 4043 is configured to train the discriminative network model by using the real sharp image frame and the sharp sample image frame, to acquire an adversarial loss function outputted by the discriminative network model. The generative network model training unit 4042 is further configured to continually train the generative network model through the adversarial loss function.

Further, according to some embodiments of this application, the loss function acquiring unit 4041 is further configured to, after the generative network model is continually trained through the adversarial loss function, reacquire a reconstruction loss function through the generative network model. The discriminative network model training unit 4043 is further configured to reacquire an adversarial loss function through the discriminative network model. The loss function acquiring unit 4041 is further configured to perform weighted fusion on the reacquired reconstruction loss function and the reacquired adversarial loss function, to acquire a fused loss function. The generative network model training unit 4042 is further configured to continually train the generative network model through the fused loss function.

According to the above description of this embodiment of this application, the N continuous image frames are first acquired from the video clip, the N image frames including the blurry image frame to be processed; then the 3D convolution processing is performed on the N image frames with the generative adversarial network model, to acquire the spatio-temporal information corresponding to the blurry image frame, the spatio-temporal information including: the spatial feature information of the blurry image frame, and the temporal feature information between the blurry image frame and the neighboring image frame of the N image frames. The deblurring processing is finally performed on the blurry image frame by using the spatio-temporal information corresponding to the blurry image frame through the generative adversarial network model, to output the sharp image frame. According to the embodiments of this application, the generative adversarial network model extracts the spatio-temporal information implicit between the continuous image frames through a 3D convolution operation, so that the deblurring processing on the blurry image frame is completed by using the spatio-temporal information corresponding to the blurry image frames through the generative adversarial network model. Therefore, a more real sharp image can be obtained, and the effect of video deblurring is enhanced.

Figure 5:
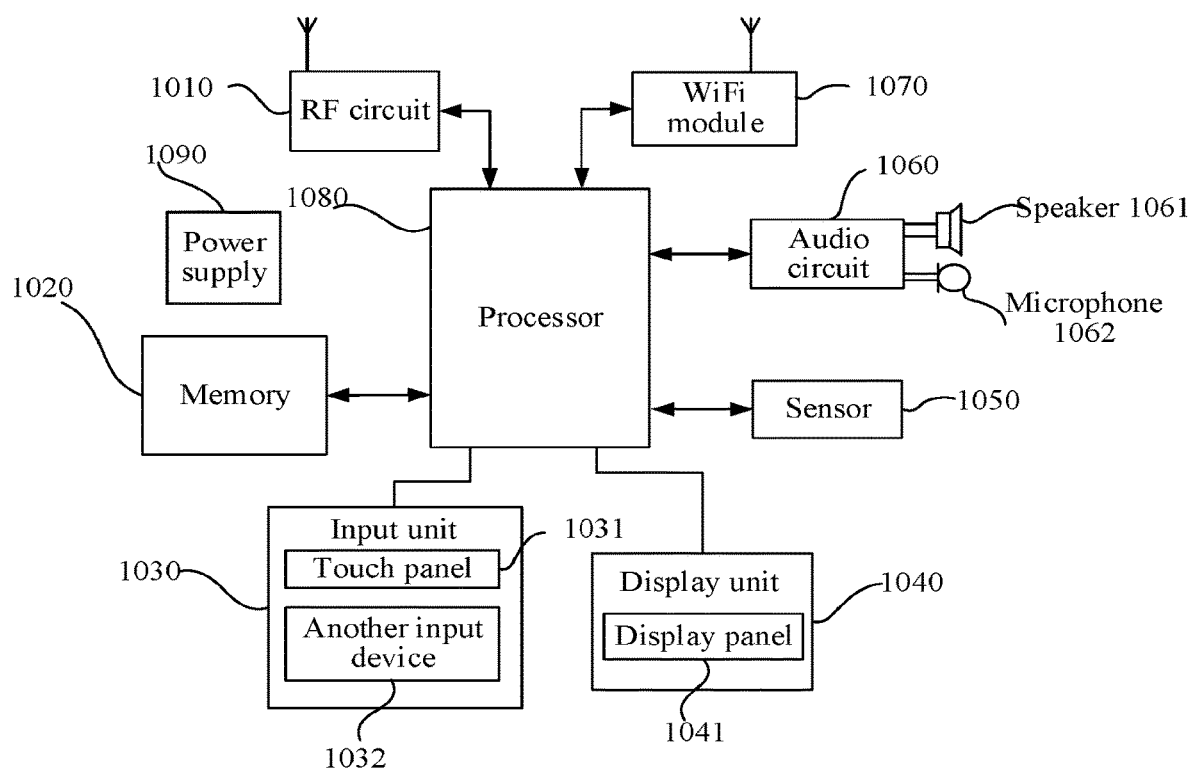
FIG. 5 is a schematic structural diagram of composition of a terminal to which a video deblurring method is applied according to an embodiment of this application.

Another terminal is further provided according to an embodiment of this application. FIG. 5 shows a schematic structural diagram of composition of a terminal to which a video deblurring method is applied according to an embodiment of this application. The terminal may be a mobile phone. As shown in FIG. 5, for ease of description, only parts related to this embodiment of this application are shown. For specific technical details not disclosed, refer to the method parts of the embodiments of this application. The terminal may be any terminal device including a mobile phone, a tablet computer, a personal digital assistant (PDA), a point of sales (POS), an on-board computer and the like, and the terminal being a mobile phone is used as an example:

Referring to FIG. 5, the mobile phone includes components such as: a radio frequency (RF) circuit 1010, a memory 1020, an input unit 1030, a display unit 1040, a sensor 1050, an audio circuit 1060, a Wi-Fi module 1070, a processor 1080, and a power supply 1090. A person skilled in the art may understand that the mobile phone structure shown in FIG. 5 constitutes no limitation on the mobile phone, and the mobile phone may include more or fewer components than those shown in the figure, or a combination of some components, or different component layouts.

The components of the mobile phone are described in detail below with reference to FIG. 5:

The RF circuit 1010 may be configured to receive and transmit signals during an information receiving and transmitting process or a call process. Specifically, the RF circuit receives downlink information from a base station, then delivers the downlink information to the processor 1080 for processing, and transmits designed uplink data to the base station. Generally, the RF circuit 1010 includes but is not limited to an antenna, at least one amplifier, a transceiver, a coupler, a low noise amplifier (LNA), a duplexer, etc. In addition, the RF circuit 1010 may further communicate with a network and another device through wireless communication. The wireless communication may use any communications standard or protocol, including but not limited to Global System of Mobile Communication (GSM), General Packet Radio Service (GPRS), Code Division Multiple Access (CDMA), Wideband Code Division Multiple Access (WCDMA), Long Term Evolution (LTE), email, Short Messaging Service (SMS), etc.

The memory 1020 may be configured to store a software program and a module, and the processor 1080 executes various function applications of the mobile phone and performs data processing by running the software program and the module that are stored in the memory 1020. The memory 1020 may mainly include a program storage area and a data storage area. The program storage area may store an operating system, an application program required for at least one function (e.g., an audio playing function and an image playing function, etc.) etc. The data storage area may store data (e.g., audio data and a phone book, etc.) created according to use of the mobile phone. In addition, the memory 1020 may include a high speed random access memory, and may further include a non-volatile memory, such as at least one magnetic disk memory device, a flash memory device, or other non-volatile solid state memory devices.

The input unit 1030 may be configured to receive an entered numeral or character information, and generate key signal input related to user setting and function control of the mobile phone. Specifically, the input unit 1030 may include a touch panel 1031 and other input devices 1032. The touch panel 1031, also referred to as a touchscreen, may collect a touch operation performed by a user on or near the touch panel (e.g., an operation performed by a user on the touch panel 1031 or near the touch panel 1031 by using any proper object or accessory, such as a finger or a stylus), and drive a corresponding connecting device according to a preset program. Optionally, the touch panel 1031 may include two parts: a touch detection apparatus and a touch controller. The touch detection apparatus detects a touch position of a user, detects a signal generated by the touch operation, and transfers the signal to the touch controller. The touch controller receives the touch information from the touch detection apparatus, converts the touch information into touch point coordinates, and transmits the touch point coordinates to the processor 1080. Moreover, the touch controller can receive and execute a command sent from the processor 1080. In addition, the touch panel 1031 may be implemented by using various types, such as a resistive type, a capacitance type, an infrared type, and a surface acoustic wave type. In addition to the touch panel 1031, the input unit 1030 may further include the another input device 1032. Specifically, the another input device 1032 may include, but is not limited to, one or more of a physical keyboard, a functional key (e.g., a volume control key or a switch key), a track ball, a mouse, and a joystick.

The display unit 1040 may be configured to display information inputted by a user or information provided to a user and various menus of the mobile phone. The display unit 1040 may include a display panel 1041. Optionally, the display panel 1041 may be configured in a form such as a liquid crystal display (LCD), an organic light-emitting diode (OLED), etc. Further, the touch panel 1031 may cover the display panel 1041. After detecting a touch operation on or near the touch panel 1031, the touch panel transfers the touch operation to the processor 1080, to determine a type of a touch event. Then, the processor 1080 provides a corresponding visual output on the display panel 1041 according to the type of the touch event. Although in FIG. 5, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (e.g., switching between landscape orientation and portrait orientation, a related game, and magnetometer attitude calibration), a function related to vibration recognition (e.g., a pedometer and a knock), and the like. Other sensors, such as a gyroscope, a barometer, a hygrometer, a thermometer, and an infrared sensor, which may be configured in the mobile phone, are not further described herein.

The audio circuit 1060, a speaker 1061, and a microphone 1062 may provide audio interfaces between a user and the mobile phone. The audio circuit 1060 may convert received audio data into an electrical signal and transmit the electrical signal to the speaker 1061. The speaker 1061 converts the electrical signal into a sound signal for outputting a sharp sample image frame; on the other hand, the microphone 1062 converts a collected sound signal into an electrical signal. The audio circuit 1060 receives the electrical signal, converts the electrical signal into audio data, and outputs the audio data to the processor 1080 for processing. Then, the processor transmits the audio data to, for example, another mobile phone by using the RF circuit 1010, or outputs the audio data to the memory 1020 for further processing.

Wi-Fi belongs to near field communication. The mobile phone may help a user transmit and receive an email, browse a webpage, access streaming media, etc. through a Wi-Fi module 1070. The Wi-Fi module provides a user with wireless broadband Internet access. Although FIG. 5 shows the Wi-Fi module 1070, it may be understood that the Wi-Fi module is not an essential component of the mobile phone, and may be completely omitted according to requirements without changing the scope of the essence of the present disclosure.

As a control center of the mobile phone, the processor 1080 is connected to all parts of the entire mobile phone by using various interfaces and lines, and performs various functions and data processing of the mobile phone by running or executing the software program and/or module stored in the memory 1020 and invoking the data stored in the memory 1020, to perform overall monitoring on the mobile phone. Optionally, the processor 1080 may include one or more processing units. The processor 1080 may integrate an application processor and a modem. The application processor mainly processes an operating system, a user interface, and an application program and the like, and the modem mainly processes wireless communication. It may be understood that the modem processor may also not be integrated into the processor 1080.

The mobile phone further includes the power supply 1090 (e.g., a battery) for supplying power to the components. The power supply may be logically connected to the processor 1080 by using a power management system, thereby implementing functions such as charging, discharging and power consumption management by using the power management system.

Although not shown in the figure, the mobile phone may further include a camera, a Bluetooth module, and the like, which are not further described herein.

According to this embodiment of this application, the processor 1080 included in the terminal further controls execution of the process of the video deblurring method executed by the terminal.

Figure 6:
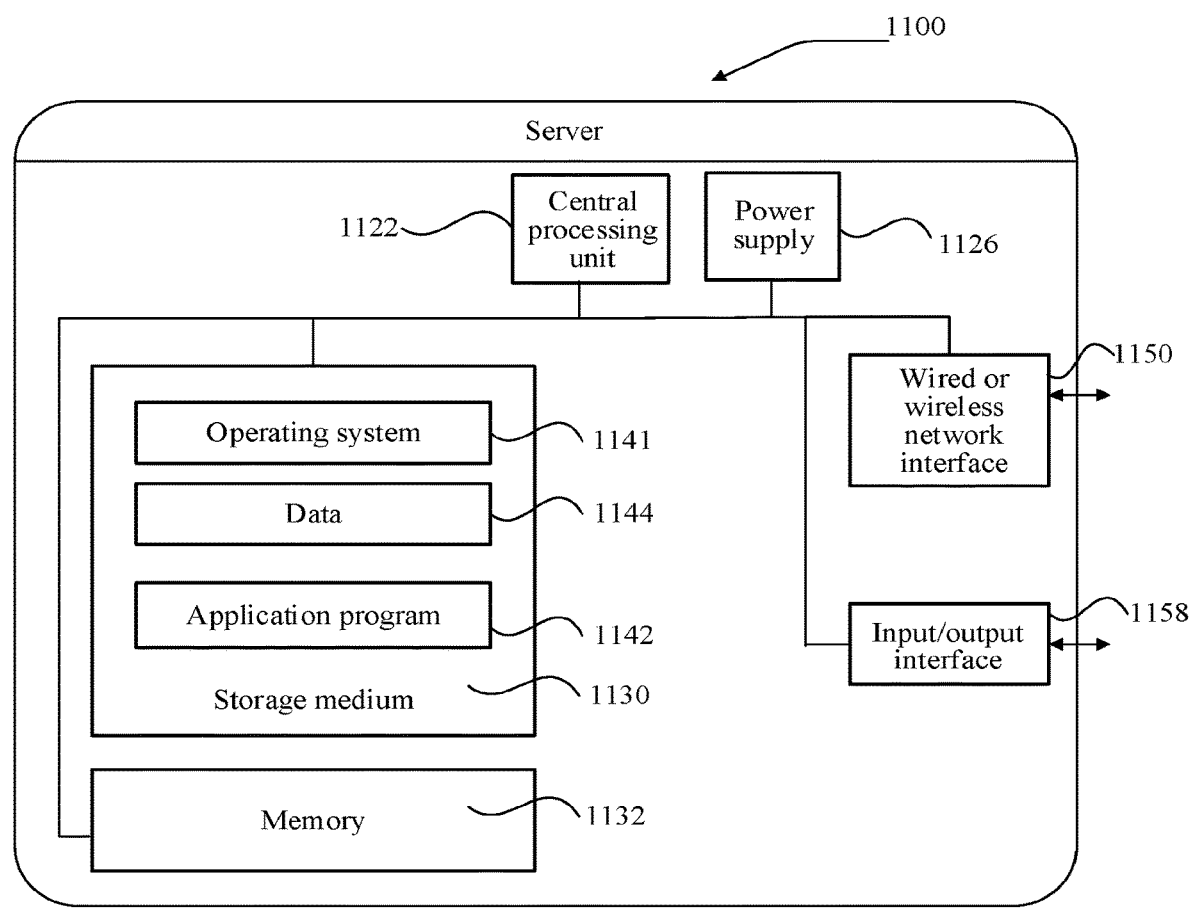
FIG. 6 is a schematic structural diagram of composition of a server to which a video deblurring method is applied according to an embodiment of this application.

FIG. 6 is a schematic structural diagram of composition of a server to which a video deblurring method is applied according to an embodiment of this application. The server 1100 may vary greatly due to different configurations or performance, and may include one or more central processing units (CPU) 1122 (e.g., one or more processors or processing circuitry) and a memory 1132, and one or more non-transitory storage mediums 1130 (e.g., one or more mass storage devices) that store an application program 1142 or data 1144. The memories 1132 and the storage mediums 1130 may be used for transient storage or permanent storage. The program stored in the storage medium 1130 may include one or more modules (not marked in the figure), and each module may include a series of instruction operations to the server. Further, the central processing unit 1122 may be set to communicate with the storage medium 1130, and execute, on the server 1100, the series of instruction operations stored in the storage medium 1130.

The server 1100 may further include one or more power supplies 1126, one or more wired or wireless network interfaces 1150, one or more input/output interfaces 1158, and/or one or more operating systems 1141 such as Windows Server™, Mac OS X™, Unix™, Linux™, and FreeBSD™.

The steps of the video deblurring method performed by the server in the foregoing embodiment may be based on the server structure shown in FIG. 6.

In addition, the described apparatus embodiment is merely an example. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments. Besides, in the accompanying drawings of the apparatus embodiments of this application, a connection relationship between modules indicates a communication connection between them, and can be specifically implemented as one or more communications buses or signal lines. A person of ordinary skill in the art may understand and implement the embodiments of this application.

According to the descriptions in the foregoing implementations, a person skilled in the art may clearly understand that the embodiments of this application may be implemented by software and necessary general hardware, and certainly can also be implemented by specific hardware (e.g., processing circuitry) including: an application-specific integrated circuit, a specific CPU, a specific memory, a specific component, and the like. Generally, any function implemented by a computer program can be easily implemented by corresponding hardware, and specific hardware structures or processing circuitry for implementing the same function may be various. The structures may be an analog circuit, a digital circuit, a specific circuit, or the like. However, for the embodiments of this application, the implementation by a software program is the better one in more cases. Based on such an understanding, the technical solutions in the embodiments of this application may be implemented in a form of a software product. The computer software product is stored in a readable storage medium such as a floppy disk of a computer, a USB flash drive, a removable hard disk, a read-only memory (ROM), a random access memory (RAM), a magnetic disk, or an optical disc and includes several instructions for instructing a computer device (which may be a personal computer, a server, a network device, or the like) to perform the method described in the embodiments of this application.

In summary, the foregoing embodiments are merely intended for describing the technical solutions of the embodiments of this application, but not for limiting the embodiments of this application. Although this application is described in detail with reference to the foregoing embodiments, a person of ordinary skill in the art needs to understand that they may still make modifications to the technical solutions described in the foregoing embodiments or make equivalent replacements to some technical features thereof, without departing from the spirit and scope of the technical solutions of the embodiments of this application.

INDUSTRIAL APPLICABILITY

According to the embodiments of this application, the N continuous image frames are first acquired from the video clip, the N image frames including the blurry image frame to be processed; and then the 3D convolution processing is performed on the N image frames with the generative adversarial network model, to acquire the spatio-temporal information corresponding to the blurry image frame, the spatio-temporal information including: the spatial feature information of the blurry image frame, and the temporal feature information between the blurry image frame and the neighboring image frame of the N image frames. The deblurring processing is finally performed on the blurry image frame by using the spatio-temporal information corresponding to the blurry image frame through the generative adversarial network model, to output the sharp image frame. According to the embodiments of this application, the generative adversarial network model extracts the spatio-temporal information implicit between the continuous image frames through a 3D convolution operation, so that the deblurring processing on the blurry image frame is completed by using the spatio-temporal information corresponding to the blurry image frames through the generative adversarial network model. Therefore, a more real sharp image can be obtained, and the effect of video deblurring is enhanced.

What is claimed is:

1. A video deblurring method, the method comprising:
acquiring, by processing circuitry of an electronic device, N continuous image frames from a video clip, the N being a positive integer, and the N continuous image frames including a blurry image frame to be processed;
performing, by the processing circuitry of the electronic device, three-dimensional (3D) convolution processing on the N continuous image frames with a generative adversarial network model that includes a generative network model and a discriminative network model, to acquire spatio-temporal information corresponding to the blurry image frame, the spatio-temporal information including spatial feature information of the blurry image frame and temporal feature information between the blurry image frame and a neighboring image frame of the N continuous image frames, the generative network model being trained based on a first reconstruction loss function, a first adversarial loss function, and a fused loss function that is determined based on a second reconstruction loss function and a second adversarial loss function, the second reconstruction loss function being reacquired through the generative network model and the second adversarial loss function being reacquired through the discriminative network model; and
performing, by the processing circuitry of the electronic device, deblurring processing on the blurry image frame by using the spatio-temporal information corresponding to the blurry image frame through the generative adversarial network model, to output a sharp image frame.

2. The method according to claim 1,
before the performing, by the processing circuitry of the electronic device, the three-dimensional (3D) convolution processing on the N continuous image frames with the generative adversarial network model, the method further includes
acquiring, by the processing circuitry of the electronic device, N continuous sample image frames and a real sharp image frame for discrimination from a video sample library, the N continuous sample image frames comprising a blurry sample image frame for training, and the real sharp image frame corresponding to the blurry sample image frame;
extracting, by the processing circuitry of the electronic device, the spatio-temporal information corresponding to the blurry sample image frame from the N continuous sample image frames by using a 3D convolution kernel in the generative network model;
performing, by the processing circuitry of the electronic device, the deblurring processing on the blurry sample image frame by using the spatio-temporal information corresponding to the blurry sample image frame through the generative network model, to output a sharp sample image frame; and
training, by the processing circuitry of the electronic device, the generative network model and the discriminative network model alternately according to the sharp sample image frame and the real sharp image frame.

3. The method according to claim 2, wherein the generative network model includes a first 3D convolution kernel, and a second 3D convolution kernel; and
the extracting, by the processing circuitry of the electronic device, the spatio-temporal information from the continuous sample image frames by using the 3D convolution kernel in the generative network model includes
performing convolution processing on the N continuous sample image frames with the first 3D convolution kernel, to acquire low-level spatio-temporal features corresponding to the blurry sample image frame;
performing the convolution processing on the low-level spatio-temporal features with the second 3D convolution kernel, to acquire high-level spatio-temporal features corresponding to the blurry sample image frame; and
fusing the high-level spatio-temporal features corresponding to the blurry sample image frame, to acquire the spatio-temporal information corresponding to the blurry sample image frame.

4. The method according to claim 2, wherein the generative network model further includes M 2D convolution kernels, the M being a positive integer; and
the performing, by the processing circuitry of the electronic device, the deblurring processing on the blurry sample image frame by using the spatio-temporal information corresponding to the blurry sample image frame through the generative network model, to output the sharp sample image frame includes
performing convolution processing on the spatio-temporal information corresponding to the blurry sample image frame by using each 2D convolution kernel of the M 2D convolution kernels in sequence, and acquiring the sharp sample image frame after the convolution processing is performed by using the last 2D convolution kernel of the M 2D convolution kernels.

5. The method according to claim 4, wherein an odd 2D convolution kernel of the M 2D convolution kernels includes a first convolutional layer, a normalization layer, and an activation function, and an even 2D convolution kernel of the M 2D convolution kernels includes a second convolutional layer and an activation function.

6. The method according to claim 2, wherein the training the generative network model and the discriminative network model alternately, includes
acquiring the first reconstruction loss function according to the sharp sample image frame and the real sharp image frame;
training the generative network model through the first reconstruction loss function;
training the discriminative network model by using the real sharp image frame and the sharp sample image frame, to acquire the first adversarial loss function outputted by the discriminative network model; and
training the generative network model continually through the first adversarial loss function.

7. The method according to claim 6, wherein the training the generative network model and the discriminative network model alternately, further includes
reacquiring the second reconstruction loss function through the generative network model, and reacquiring the second adversarial loss function through the discriminative network model, after the training the generative network model continually through the first adversarial loss function;
performing weighted fusion on the reacquired second reconstruction loss function and the reacquired second adversarial loss function, to acquire the fused loss function; and
training the generative network model continually through the fused loss function.

8. A video deblurring apparatus, comprising:
processing circuitry configured to
acquire N continuous image frames from a video clip, the N being a positive integer, and the N continuous image frames including a blurry image frame to be processed;
perform three-dimensional (3D) convolution processing on the N continuous image frames with a generative adversarial network model that includes a generative network model and a discriminative network model, to acquire spatio-temporal information corresponding to the blurry image frame, the spatio-temporal information including spatial feature information of the blurry image frame, and temporal feature information between the blurry image frame and a neighboring image frame of the N continuous image frames, the generative network model being trained based on a first reconstruction loss function, a first adversarial loss function, and a fused loss function that is determined based on a second reconstruction loss function and a second adversarial loss function, the second reconstruction loss function being reacquired through the generative network model and the second adversarial loss function being reacquired through the discriminative network model; and
perform deblurring processing on the blurry image frame by using the spatio-temporal information corresponding to the blurry image frame through the generative adversarial network model, to output a sharp image frame.

9. The apparatus according to claim 8, wherein
the processing circuitry is further configured to
acquire N continuous sample image frames and a real sharp image frame for discrimination from a video sample library, the N continuous sample image frames including a blurry sample image frame for training, and the real sharp image frame corresponding to the blurry sample image frame;
extract the spatio-temporal information corresponding to the blurry sample image frame from the N continuous sample image frames by using a 3D convolution kernel in the generative network model;
perform the deblurring processing on the blurry sample image frame by using the spatio-temporal information corresponding to the blurry sample image frame through the generative network model, to output a sharp sample image frame; and
train the generative network model and the discriminative network model alternately according to the sharp sample image frame and the real sharp image frame.

10. The apparatus according to claim 9, wherein the generative network model includes a first 3D convolution kernel, and a second 3D convolution kernel; and
the processing circuitry is further configured to
perform convolution processing on the N continuous sample image frames with the first 3D convolution kernel, to acquire low-level spatio-temporal features corresponding to the blurry sample image frame;
perform the convolution processing on the low-level spatio-temporal features with the second 3D convolution kernel, to acquire high-level spatio-temporal features corresponding to the blurry sample image frame; and
fuse the high-level spatio-temporal features corresponding to the blurry sample image frame, to acquire the spatio-temporal information corresponding to the blurry sample image frame.

11. The apparatus according to claim 9, wherein the generative network model further includes M 2D convolution kernels, the M being a positive integer; and
the processing circuitry is specifically configured to perform convolution processing on the spatio-temporal information corresponding to the blurry sample image frame by using each 2D convolution kernel of the M 2D convolution kernels in sequence, and acquire the sharp sample image frame after the convolution processing is performed by using the last 2D convolution kernel of the M 2D convolution kernels.

12. The apparatus according to claim 11, wherein an odd 2D convolution kernel of the M 2D convolution kernels includes a first convolutional layer, a normalization layer, and an activation function, and an even 2D convolution kernel of the M 2D convolution kernels comprises: a second convolutional layer and an activation function.

13. The apparatus according to claim 9, wherein the processing circuitry is further configured to acquire the first reconstruction loss function according to the sharp sample image frame and the real sharp image frame;

train the generative network model through the first reconstruction loss function;

train the discriminative network model by using the real sharp image frame and the sharp sample image frame, to acquire the first adversarial loss function outputted by the discriminative network model; and continually train the generative network model through the first adversarial loss function.

14. The apparatus according to claim 13, wherein the processing circuitry is further configured to after the generative network model is continually trained through the first adversarial loss function, reacquire the second reconstruction loss function through the generative network model;

reacquire the second adversarial loss function through the discriminative network model;

perform weighted fusion on the reacquired second reconstruction loss function and the reacquired second adversarial loss function, to acquire the fused loss function; and continually train the generative network model through the fused loss function.

15. A non-transitory computer-readable storage medium storing instructions which when executed by at least one processor cause the at least one processor to perform:

acquiring N continuous image frames from a video clip, the N being a positive integer, and the N continuous image frames including a blurry image frame to be processed;

performing three-dimensional (3D) convolution processing on the N continuous image frames with a generative adversarial network model that includes a generative network model and a discriminative network model, to acquire spatio-temporal information corresponding to the blurry image frame, the spatio-temporal information including spatial feature information of the blurry image frame, and temporal feature information between the blurry image frame and a neighboring image frame of the N continuous image frames, the generative network model being trained based on a first reconstruction loss function, a first adversarial loss function, and a fused loss function that is determined based on a second reconstruction loss function and a second adversarial loss function, the second reconstruction loss function being reacquired through the generative network model and the second adversarial loss function being reacquired through the discriminative network model; and performing deblurring processing on the blurry image frame by using the spatio-temporal information corresponding to the blurry image frame through the generative adversarial network model, to output a sharp image frame.

16. The non-transitory computer-readable storage medium according to claim 15, wherein before the performing three-dimensional (3D) convolution processing on the N continuous image frames with the generative adversarial network model, the at least one processor is caused to perform acquiring N continuous sample image frames and a real sharp image frame for discrimination from a video sample library, the N continuous sample image frames comprising a blurry sample image frame for training, and the real sharp image frame corresponding to the blurry sample image frame;

extracting the spatio-temporal information corresponding to the blurry sample image frame from the N continuous sample image frames by using a 3D convolution kernel in the generative network model;

performing the deblurring processing on the blurry sample image frame by using the spatio-temporal information corresponding to the blurry sample image frame through the generative network model, to output a sharp sample image frame; and training the generative network model and the discriminative network model alternately according to the sharp sample image frame and the real sharp image frame.

17. The non-transitory computer-readable storage medium according to claim 16, wherein the generative network model includes a first 3D convolution kernel, and a second 3D convolution kernel; and the extracting, by the at least one processor, the spatio-temporal information corresponding to the blurry sample image frame from the N continuous sample image frames by using the 3D convolution kernel in the generative network model includes performing convolution processing on the N continuous sample image frames with the first 3D convolution kernel, to acquire low-level spatio-temporal features corresponding to the blurry sample image frame;

performing the convolution processing on the low-level spatio-temporal features with the second 3D convolution kernel, to acquire high-level spatio-temporal features corresponding to the blurry sample image frame; and fusing the high-level spatio-temporal features corresponding to the blurry sample image frame, to acquire the spatio-temporal information corresponding to the blurry sample image frame.

18. The non-transitory computer-readable storage medium according to according to claim 16, wherein the generative network model further includes M 2D convolution kernels, the M being a positive integer; and the performing, by the at least one processor, the deblurring processing on the blurry sample image frame by using the spatio-temporal information corresponding to the blurry sample image frame through the generative network model, to output the sharp sample image frame includes performing convolution processing on the spatio-temporal information corresponding to the blurry sample image frame by using each 2D convolution kernel of the M 2D convolution kernels in sequence, and acquiring the sharp sample image frame after the convolution processing is performed by using the last 2D convolution kernel of the M 2D convolution kernels.

19. The non-transitory computer-readable storage medium according to according to claim 18, wherein an odd 2D convolution kernel of the M 2D convolution kernels includes a first convolutional layer, a normalization layer, and an activation function, and an even 2D convolution kernel of the M 2D convolution kernels includes a second convolutional layer and an activation function.

20. The non-transitory computer-readable storage medium according to according to claim 16, wherein the training the generative network model and the discriminative network model alternately, according to the sharp sample image frame and the real sharp image frame, includes
- acquiring the first reconstruction loss function according to the sharp sample image frame and the real sharp image frame;
- training the generative network model through the first reconstruction loss function;
- training the discriminative network model by using the real sharp image frame and the sharp sample image frame, to acquire the first adversarial loss function outputted by the discriminative network model; and
- training the generative network model continually through the first adversarial loss function.

* * * * *